US007636103B2

(12) United States Patent
Fukuda et al.

(10) Patent No.: US 7,636,103 B2
(45) Date of Patent: Dec. 22, 2009

(54) DOOR PHONE SYSTEM

(75) Inventors: Tatsuro Fukuda, Fukuoka (JP);
Toshiyuki Sugitani, Miyaki-gun (JP)

(73) Assignee: Panasonic Corporation, Osaka (JP)

( * ) Notice: Subject to any disclaimer, the term of this patent is extended or adjusted under 35 U.S.C. 154(b) by 777 days.

(21) Appl. No.: 11/247,187

(22) Filed: Oct. 12, 2005

(65) Prior Publication Data
US 2006/0082454 A1 Apr. 20, 2006

(30) Foreign Application Priority Data
Oct. 14, 2004 (JP) ............................. 2004-299891

(51) Int. Cl.
*H04N 7/14* (2006.01)
*H04N 9/47* (2006.01)

(52) U.S. Cl. ................. 348/14.01; 348/14.02; 348/153; 455/66.1

(58) Field of Classification Search ... 348/14.01–14.16, 348/143, 152, 153; 379/106.01, 90.01; 455/507, 455/66.1
See application file for complete search history.

(56) References Cited

U.S. PATENT DOCUMENTS

| | | | |
|---|---|---|---|
| 5,933,782 A | 8/1999 | Nakano | |
| 2001/0001609 A1 | 5/2001 | Mikuni et al. | |
| 2001/0027112 A1 | 10/2001 | Voyer | |
| 2002/0060997 A1 | 5/2002 | Hwang | |
| 2004/0022377 A1* | 2/2004 | Elberbaum | 379/106.01 |
| 2004/0037251 A1 | 2/2004 | Shneyour et al. | |
| 2004/0192362 A1* | 9/2004 | Vicari | 455/507 |

FOREIGN PATENT DOCUMENTS

| | | |
|---|---|---|
| CN | 1175173 | 3/1998 |
| CN | 1311613 | 9/2001 |
| CN | 1354572 | 6/2002 |
| DE | 29819957 | 4/1999 |
| DE | 19811197 | 9/1999 |
| EP | 1091609 | 4/2001 |
| EP | 1124375 | 8/2001 |
| EP | 1453247 | 9/2004 |
| JP | 07288500 | 10/1995 |
| JP | 9107409 | 4/1997 |
| JP | 09107409 | 4/1997 |
| JP | 2000092235 | 3/2000 |
| JP | 2003258810 | 9/2003 |
| JP | 2005159534 | 6/2005 |

(Continued)

OTHER PUBLICATIONS

International Search Report dated Apr. 6, 2006.

(Continued)

*Primary Examiner*—Melur Ramakrishnaiah
(74) *Attorney, Agent, or Firm*—Dickinson Wright PLLC

(57) ABSTRACT

An indoor master unit 200 divides image information stored in an image information storage unit 203 and taken by a camera unit 101 of a front door slave unit 100 into a length capable of being transmitted in one TDMA time slot, and writes a transmission sequence number, respectively, and transmits the same information several times. The plurality of wireless monitor slave units 300a to 300n at the receiver side delete an error packet and repetitively received image information, and perform image display.

17 Claims, 9 Drawing Sheets

FOREIGN PATENT DOCUMENTS

| | | |
|---|---|---|
| WO | 9914885 | 3/1999 |
| WO | 0106791 | 1/2001 |
| WO | 03096696 | 11/2003 |

OTHER PUBLICATIONS

English translation of DE 298,19,957.
Written Opinion of ISA (PCT/JP2005/006553) dated Aug. 22, 2005.
PCT International Search Report (PCT/JP2005/006553) dated Aug. 22, 2005.
"Digital Enhanced Cordless Telecommunications (DECT); Common Interface (CI); Part 4: Data Link Control (DLC) layer," EN 300 175-4 V1.4.2, 1999-2006, pp. 1-144.
"Digital Enhanced Cordless Telecommunications (DECT); DECT derivative for implementation in the 2,45 GHz ISM Band (DECT-ISM)," ETSI TS 101 948 V1.1.1, Apr. 2001, pp. 1-22.
Chinese Office Action dated Dec. 21, 2007 with English Translation thereof.

\* cited by examiner

CRC1: ERROR DETECTION SIGNAL IN CONTROL DATA FIELD
CRC2: ERROR IN INFORMATION DATA FIELD

CRC1: ERROR DETECTION SIGNAL IN CONTROL DATA FIELD
CRC2: ERROR IN INFORMATION DATA FIELD

FIG. 5

| INDEX | P1 | P2 | P3 | ... | P10 |
|---|---|---|---|---|---|
| 1 | f1 | f2 | f3 | ... | f10 |
| 2 | f2 | f3 | f4 | ... | f1 |
| 3 | f3 | f4 | f5 | ... | f2 |
| 4 | f4 | f5 | f6 | ... | f3 |
| 5 | f5 | f6 | f7 | ... | f4 |
| 6 | f6 | f7 | f8 | ... | f5 |
| 7 | f7 | f8 | f9 | ... | f6 |
| 8 | f8 | f9 | f10 | ... | f7 |
| 9 | f9 | f10 | f1 | ... | f8 |
| 10 | f10 | f1 | f2 | ... | f9 |

DOOR PHONE SYSTEM

BACKGROUND OF THE INVENTION

1. Field of the Invention

The present invention relates to a door phone system in which a door phone image is displayed on a portable wireless monitor slave unit using a wireless communication.

2. Description of the Related Art

A conventional TV door phone system is configured by a camera equipped front door slave unit and a monitor equipped indoor master unit wired connected to a corresponding front door slave unit. However, in order to easily respond to a visitor even when a respondent is not around the indoor master unit, it has been recently proposed that an image is displayed on a portable display device (wireless monitor slave unit) using a wireless communication and that a voice answering to the corresponding front door slave unit is allowed in the wireless monitor slave unit (see Patent Document 1). In the TV door phone system described in Patent Document 1, when a wireless monitor slave unit does not exist in a range of a wireless communication of the indoor master unit, a public switched telephone line is used to call the wireless monitor slave unit, and with only one wireless monitor slave unit, a one-to-one communication is made between the indoor master unit or the wireless base station and the wireless monitor slave unit. When a visitor manipulates a call switch of the front door slave unit, the indoor master unit having a wireless communication function checks whether there is a wireless monitor slave unit in a range of the wireless communication, and if so, transmits image data from the indoor master unit to the wireless monitor slave unit. Further, the visitor image is displayed on the wireless monitor slave unit and at the same time, when there is an answer from the wireless monitor slave unit, a communication path is established, so that a telephone call between the front door slave unit and the wireless monitor slave unit is enabled. In addition, a TV door phone system has been proposed to which a plurality of wireless monitor slave units can be connected (see Patent Document 2).

[Patent Document 1] JP-A-1997-107409
[Patent Document 2] JP-A-2000-92235

In the TV door phone system as described above latent Document 2), when a visitor manipulates a call switch of the front door slave unit, an indoor master unit having a wireless communication function calls a plurality of wireless monitor slave units through a control channel, and a communication channel is established between the indoor master unit and an answered wireless monitor slave unit, and a telephone call and image data transmission is performed with the front door slave unit through the communication channel. Therefore, in the door phone system as described in Patent Document 2, there is a drawback in that the visitor image can be checked before answering. As such, the conventional wireless monitor append TV door phone system makes a call after displaying images of the front door slave unit on one wireless monitor slave unit, or calls a plurality of wireless monitor slave units, but it cannot display images of the front door slave unit on the plurality of wireless monitor slave unit before answering.

In addition, generally, an apparatus that communicates image information or voice information wirelessly establishes a one-to-one two-way wireless link at a transmission side and a reception side, to thus make a communication. For this reason, in case of sending image informing to a plurality of cordless slave units at the same time, it is necessary to have a plurality of wireless units at the transmission side. In addition, when a wireless device is used that makes a multiplexing communication such as TDMA, a plurality of communications can be made at the same time without having a plurality of wireless devices such as transmitters, receivers, and antennas. Further, it is possible to transmit image information to the plurality of cordless slave units at the same time. However, in case of the TDMA scheme, there is an upper limit to the number of slots accepted in one frame, so that there is a limit to the number of simultaneous transmissions. In addition, in case that simply broadcasted and transmitted image information is simply displayed on the wireless monitor slave unit, when the wireless monitor slave unit cannot receive a call signal or image information transmitted from the monitor appended indoor master unit due to a wireless communication error, there is a problem in that a calling sound does not ring or an image is susceptible to be distorted. In addition, in case of a two-way communication, it is possible to detect a wireless interference with other devices based on a poor receiving state, and to avoid interference by changing a communication frequency. However, when image information is transmitted in the broadcasting transmission, it is not possible to detect a receiving error state at the transmission side (broadcasting source), so that there is a problem in that it is not possible to avoid interference.

SUMMARY OF THE INVENTION

An object of the present invention is to improve convenience in an image and voice communication between a plurality of indoor slave units and a front door slave unit.

According to the present invention, there is provided a door phone system door phone system comprising an outdoor slave unit, a master unit arranged isolated from the outdoor slave unit and being capable of communicating with the outdoor slave unit, and a plurality of indoor slave units capable of wirelessly communicating with the master unit. The outdoor slave unit may comprise a camera unit, a microphone unit, a speaker unit, a calling unit that calls the master unit, and a first communication unit that communicates with the master unit. The master unit may comprise a microphone unit, a speaker unit, a display unit, an answering unit that answers a call from the calling unit of the outdoor slave unit, and a second communication unit that communicates with the outdoor slave unit and the cordless slave unit. Each of the plurality of cordless slave unit comprises a display unit, a microphone unit, a speaker unit, and a third communication unit that communicates with the master unit. With the calling unit of the outdoor slave unit activated, the camera of the outdoor slave unit may operate and transmit an image to the master unit. The master unit may transmit the image received from the outdoor slave unit to a second one of the plurality of the cordless slave units at the same time. The plurality of cordless slave units may display a received image on the display unit of the respective cordless slave unit. Further, the master unit that detects that the communication unit of one of the plurality of the cordless slave units receiving the image is activated may transmit a further image taken by the first cordless slave unit only to the first cordless slave unit.

BRIEF DESCRIPTION OF THE DRAWINGS

FIG. 5 is a diagram showing an example of a hopping pattern for use in a door phone system according to an exemplary door phone system of the present invention.

DETAILED DESCRIPTION OF PREFERRED EMBODIMENT

Embodiment 1

Hereinafter, a first embodiment of the present invention will now be described with reference the accompanying drawings.

Figure 6:
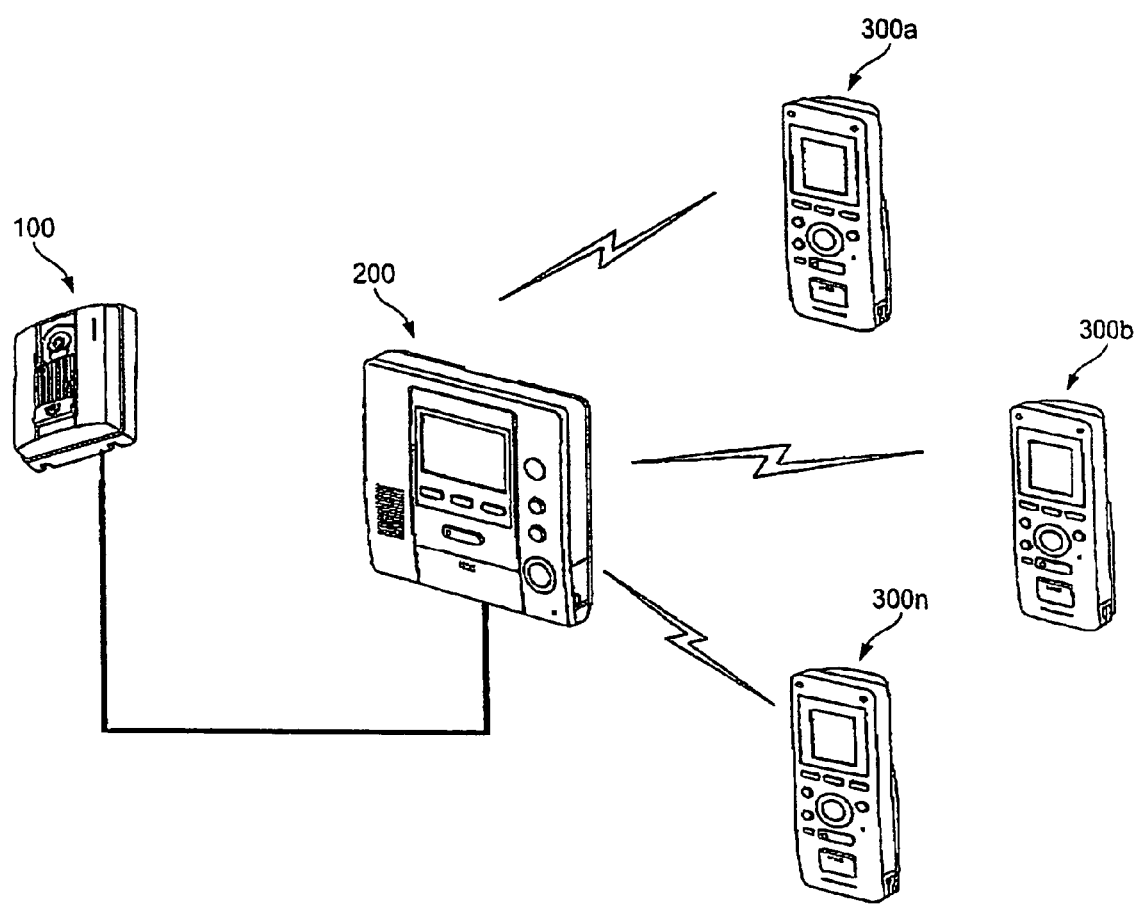
FIG. 6 is a diagram showing an overall arrangement of a door phone system.

FIG. 6 is a diagram showing an overall arrangement of a door phone system.

When a visitor manipulates a call switch 103a by using a front door (outdoor) handset 100, a calling signal is transmitted to wireless monitor (indoor) slave units 300a to 300n via an indoor master unit 200, a ringing tone is produced at each of the wireless monitor slave units 300a to 300n. In addition, an image signal taken by the camera of the front door slave unit 100 passes through the indoor master unit 200 and then a visitor image is transmitted to all of the wireless monitor slave units 300a to 300n. The user can see the visitor image on any wireless monitor slave unit 300a to 300n.

When there is an answer for one of the wireless monitor slave units 300a to 300n, the answering signal is transmitted to the indoor master unit 200, and the visitor image taken by the front door slave unit 100 is transmitted from the indoor master unit 200 to the answered wireless monitor slave unit (any of 300a to 300n), and thus the visitor image can be checked through the answered wireless monitor slave unit.

Figure 1:
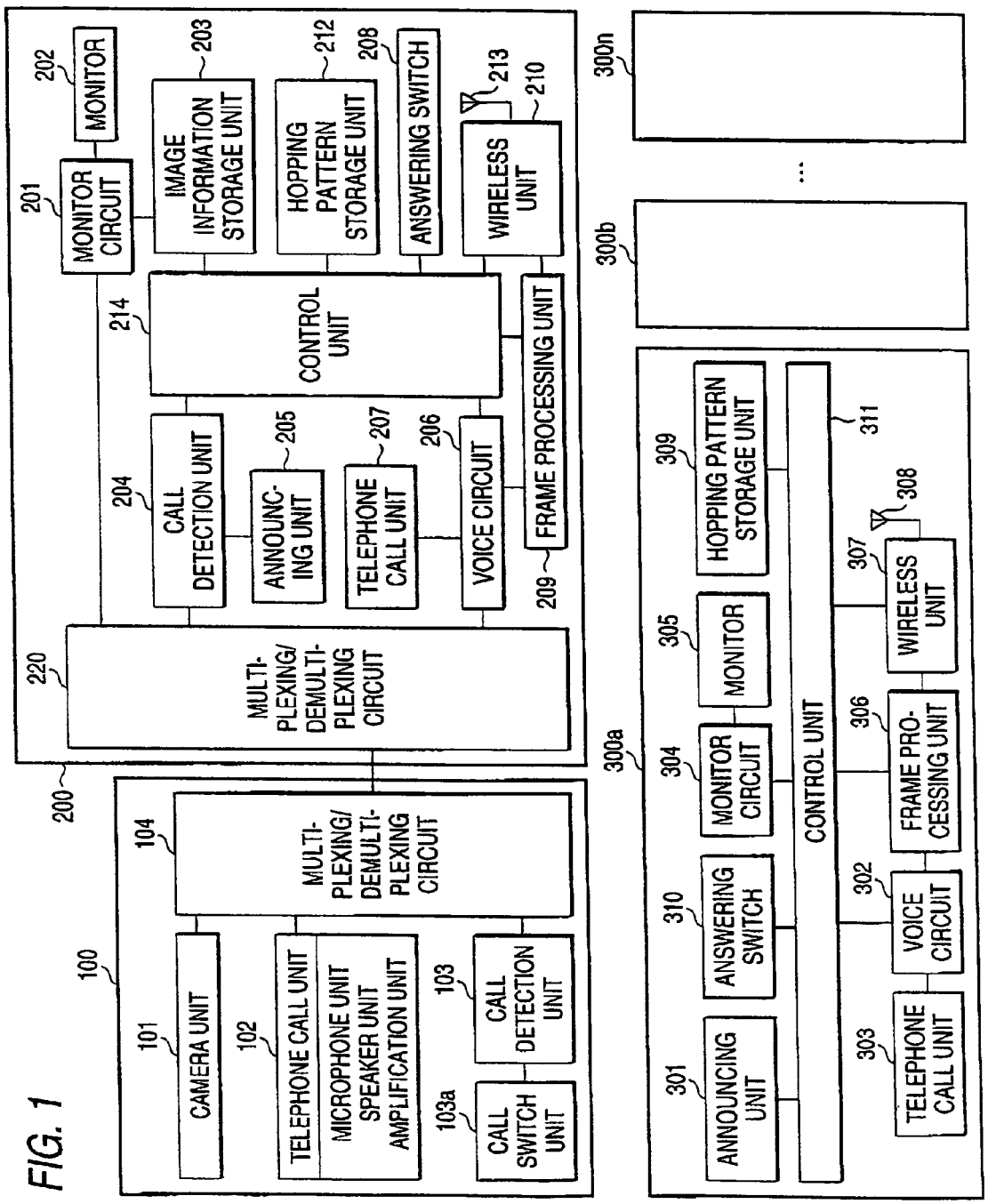
FIG. 1 is a functional block diagram showing a door phone system according to an embodiment of the present invention.

FIG. 1 is a block diagram of a door phone system that transmits an image using a first embodiment of the present invention. Hereinafter, each functional block of the first embodiment of the door phone system according to the present invention will be described with reference to FIG. 1.

In FIG. 1, reference numeral 100 indicates a front door (outdoor) slave unit, reference numeral 200 indicates an indoor master unit, and reference numerals 300a to 300n indicate wireless monitor (indoor) slave units. For the front door slave unit, reference numeral 101 indicates a camera unit that makes an image and outputs an image signal, reference numeral 102 indicates a telephone call unit that includes a microphone unit, a speaker unit, and an amplification unit to output a voice signal to the speaker unit, amplify the input signal at the microphone unit, and output the visitor's voice signal. Reference numeral 103 indicates a call detection unit having a call switch for informing a visitor's visit and a circuit for generating an informing signal when the call switch is pushed. Reference numeral 104 indicates a multiplexing/demultiplexing circuit that synthesizes an image signal, a voice signal and an informing signal to outputs the synthesized signal to the indoor master unit 200, and separates the voice signal from the indoor master unit 200 to output to the telephone call unit 102.

In addition, for the indoor master unit 200, reference numeral 220 indicates a multiplexing/demultiplexing circuit that separates an image signal, a voice signal and an informing signal from the front door slave unit 100 to output to each unit of the indoor master unit 200, and outputs the voice signal from the indoor master unit 200 to the front door master unit 100. Reference numeral 201 indicates a monitor circuit that outputs an image signal from the front door slave unit 100 separated and output from the multiplexing/demultiplexing circuit 220, and converts the image signal into a digital signal to output as image information. Reference numeral 202 indicates a monitor that displays an image signal, and reference numeral 203 indicates an image information storage unit that stores a digital converted image signal i.e., image information output from the monitor circuit.

Reference numeral 204 indicates a call detection unit that detects the informing signal from the front door slave unit 100 separated and output from the multiplexing/demultiplexing circuit 220 and informs the signal to the control unit 214, and at the same time, activates the annunciating unit 205. Reference numeral 205 indicates an annunciating unit that produces an alarm sound to inform the visitor's visit.

Reference numeral 206 indicates a voice circuit that outputs a voice signal from the front door slave unit 100 separated and output from the multiplexing/demultiplexing circuit 220 to the telephone call unit 207, outputs the voice signal from the telephone call unit 207 to the multiplexing/demultiplexing circuit 220, and converts the voice signal from the front door slave unit 100 into a digital signal to output as voice information, for example, converts the voice information transmitted from the answered wireless monitor slave unit into an analog signal to output to the multiplexing/demultiplexing circuit 220. Reference numeral 207 indicates a telephone call unit that includes a microphone, a speaker unit, and an amplification unit, though not shown in the drawing, and outputs the voice signal to the speaker unit, and in addition, amplifies the input signal in the microphone unit to output the voice signal.

Reference numeral 208 indicates an answering switch that activates an answering operation when responding to the visitor at the indoor master unit 200. Reference numeral 209 indicates a frame processing unit that adds a sync signal required for a TDMA communication and an error detection signal for error detection to voice information, image information, and a control signal, generates a transmission data string according to a frame time slot of the TDMA, and in addition, performs error detection processing according to the TDMA frame and the time slot from the received reception data string, and outputs voice information and a control signal received at the time slot having no error. Reference numeral 210 indicates a wireless unit that modulates and amplifies an input data string, amplifies and demodulates the received wireless signal, and outputs the received data to perform TDMA wireless transmission/reception using a frequency hopping.

Reference numeral 212 indicates a hopping pattern storage unit that stores a hopping pattern for use in a frequency hopping. Reference numeral 213 indicates an antenna and reference numeral 214 indicates a control unit that controls division and retransmission of image information, controls an overall indoor master unit 200 that is, controls each unit for transmitting image information to a wireless monitor slave unit and an overall indoor master unit 200 such as each unit control when answering the visitor with the indoor master unit 200. In addition, for the wireless monitor slave unit 300a, reference numeral 301 indicates an annunciating unit that makes a sound to inform the visitor's visit.

Reference numeral 302 indicates a voice circuit that converts voice information from the indoor master unit 200 into analog one to output to the telephone call unit 207, and converts the voice signal transmitted from the telephone call unit 207 into a digital one to output to the frame processing unit 306. Reference numeral 303 indicates a telephone call unit that includes a microphone unit, a speaker unit, and an amplification unit, though not shown in the drawing, and outputs a voice signal to the speaker unit, and in addition, amplifies an input signal from the microphone unit to output the voice signal. Reference numeral 304 indicates a monitor circuit that generates and outputs an image signal based on image information and error information from the indoor master unit 200. Reference numeral 305 indicates a monitor that displays an image signal as an image. Reference numeral 306 indicates a frame processing unit that adds a sync signal required for a TDMA communication and an error detection code for error detection to voice information a control signal, generates a transmission data string according to a time slot of the TDMA, and in addition, performs error detection processing according to the TDMA frame and the time slot from the received reception data string, and outputs image information, voice information and a control signal received at the time slot having no error.

Reference numeral 307 indicates a wireless unit that modulates and amplifies an input data string, amplifies and demodulates the received wireless signal, and outputs the received data to perform TDMA wireless transmission/reception using a frequency hopping. Reference numeral 308 indicates an antenna, and reference numeral 309 indicates a hopping pattern storage unit that stores a hopping pattern for use in the frequency hopping. Reference numeral 310 indicates an answering switch that informs activation or telephone call completion of an answering action when responding to the visitor using the wireless monitor slave unit 300a. Reference numeral 311 indicates a control unit that controls an overall wireless monitor slave unit, such as controls each unit for receiving image information and voice information transmitted from the indoor master unit 200, controls to output image information other than repeated image information by deleting repetitively received image information to the monitor circuit 304, and controls each unit when answering the visitor with the wireless monitor slave unit 300a.

A plurality of wireless monitor slave units are arranged, which are denoted by 300b to 300n. Arrangements and functions of the wireless monitor slave units are the same as those of the wireless monitor slave unit 300a. Hereinafter, elements 301 to 309 when a common description on the wireless monitor slave units 300a to 300n is given, refer to all elements 301 to 309 of the wireless monitor slave units 300a to 300n.

Next, an overview of an operation of the above-mentioned door phone will be described. First, a calling operation of the visitor will be described. When the visitor pushes the call switch 103a arranged on the call detection unit 103 of the front door slave unit 100, an informing signal is output from the call (manipulation) detection unit 103, and output to the indoor master unit 200 through the multiplexing/demultiplexing circuit 104. For the indoor master unit 200, the informing signal from the front door slave unit 100 is output to the call detection unit 204 from the multiplexing/demultiplexing circuit 220. Further, the call detection unit 204 activates the annunciating unit 205, and outputs an alarm sound from the annunciating unit 205 to indicate that there is a calling from the visitor. In other words, when the call detection unit 204 receives the informing signal, it informs the control unit 214 that the call switch of the call detection unit 103 of the front door slave unit 100 is pushed. In addition, the control unit 214 of the indoor handset 200 begins a control over transmission of annunciating information for informing the wireless monitor slave units 300a to 300n that call activation and transmission of image information begins.

The wireless monitor slave units 300a to 300n operates as a slave station of the indoor master unit 200, and commonly, operates to receive the control signal of the indoor master unit 200, so that when the annunciating information from the indoor master unit 200 is received and informed to the control unit 311, the control unit 311 activates the annunciating unit 301, and the annunciating unit 301 outputs an alarm sound for informing that there is a calling from the visitor. In other words, when the call switch of the front door slave unit 100 is pushed, the indoor master unit 200 and the wireless monitor slave units 300a to 300n are informed that the above-mentioned call switch is pushed, so that annunciating units 205 and 301 are controlled to produce the alarm sound, and the image signal taken by the camera unit 101 of the front door slave unit 100 is sent to the indoor master unit 200 and the wireless monitor slave units 300a to 300n, and thus, the monitors 202 and 304 are controlled to display the image signal.

The image signal taken by the camera unit 101 of the front door slave unit 100 is sent to the multiplexing/demultiplexing circuit 104 and output to the indoor master unit 200. The image signal sent from the front door slave unit 100 is output from the multiplexing/demultiplexing circuit 200 to the monitor circuit 201, and the monitor circuit 201 outputs the image signal to the monitor 202, and the image taken by the camera unit 101 of the front door slave unit 100 is displayed on the monitor 202. In addition, the control unit 214 of the indoor master unit 200 performs simultaneously a control over transmission of the annunciating information to the above-mentioned wireless monitor slave units 300a to 300n, and request to start image data storage onto the image information storage unit 203. When the image information storage unit 203 receives the request to start image data storage, it requests to output image information to the monitor circuit 201, and stores image information output from the monitor circuit 201. The monitor circuit 201 converts a signal for one screen of the image signal sent from the front door slave unit 100 into a digital one and output the digital signal to the image information storage unit 203 as image information. In addition, when the image information storage unit 203 stores the image information for one screen output from the monitor circuit 201, it outputs a notice of storage completion to the control unit 214.

When the control unit 214 receives the notice of storage completion, the control unit 214 divides image information stored in the image storage unit 204 into a data length transmittable in one slot, sequentially reads the divided image information, and transmits the read image information divided for one slot in each predetermined number of times and predetermined time slot.

Further, when the control unit 311 of the wireless monitor slave units 300a to 300n receives annunciating information, the control unit 311 controls the wireless unit 307 and the frame processing unit 206 to receive a predetermined time slot and receive image information sent from the indoor master unit 200. In addition, when the control unit 311 receives the image information from the indoor master unit 200, the control unit 311 outputs the received image information to the monitor circuit 304 other than repetitively received and divided image information, converts image information from the monitor circuit 304 into an analog one to output to the monitor 304, and display image sent from the indoor master unit 200 on the monitor 305.

In addition, when the control unit 214 of the indoor master unit finishes transmitting image information for one screen stored in the image storage unit 204, the control unit 214 requests to start storage of the image data, and accordingly, image information is updated, so that a control is made such that an operation to transmit new image information to the wireless monitor slave units 300a to 300n is repeatedly conducted. In addition, at this time, the control unit 214 may perform transmission of annunciating information to indicate transmission start of the image information, for each transmission start of new image information for one screen.

Next, 'answering operation' will be described. When the answering switch 208 of the indoor master unit 200 is pushed and the pushing-down is detected by the control unit 214, the control unit 214 activates the voice circuit 206, and controls the voice circuit 206 such that a voice communication between the front door slave unit 100 and the indoor master unit 200 is enabled. In other words, the voice input to the microphone unit of the telephone call unit 102 of the front door slave unit 100 is output to the speaker of the telephone call unit 207 of the indoor master unit 200, and the voice input to the microphone unit of the telephone call unit 207 of the indoor master unit 200 is output to the speaker unit of the telephone call unit 102 of the front door slave unit 100. In addition, for example, when the answering switch 310 of the wireless monitor slave unit 300a is pushed and the pushing-down is detected by the control unit 311, the control unit 311 activates the voice circuit 302, and controls the voice circuit 302 such that a voice communication between the front door slave unit 100 and the wireless monitor slave unit 300a is enabled, and at the same time, transmits a signal to stop the image display on the non-answered wireless monitor slave unit 300b to 300n in a broadcasting manner.

In other words, first, the control unit activates a two-way wireless link, starts a two-way communication with the indoor master unit 200, and establishes a voice path of the indoor master unit 200. Further, the voice input to the microphone unit of the telephone call unit 303 of the wireless monitor slave unit 300a is converted into a digital one through the voice circuit 302, and output to the frame processing unit 306, and wirelessly transmitted to the indoor master unit 200, and voice information output from the frame processing unit 306 is output to the voice circuit 302 and converted into analog one, and is output to the speaker unit of the telephone call unit 303. Further, when the two-way wireless link with the wireless monitor slave unit 300a is activated and thus the two-way communication with the wireless monitor slave unit 300a begins, the control unit 214 of the indoor master unit 200 converts the voice signal sent from the front door slave unit 100 into a digital signal through the voice circuit 206, outputs the digital signal to the frame processing unit 209, and performs wireless transmission to the wireless monitor slave unit 300a, and the voice information output from the frame processing unit 209 is output to the voice circuit 206, and converted into analog information, sent to the front door slave unit 100 through the multiplexing/demultiplexing circuit 201, output the information to the speaker of the telephone call unit 102 of the front door slave unit 100.

Next, wireless communication control between the indoor master unit 200 and the wireless monitor slave units 300a to 300n will be described. Here, when one frame is divided into 8 time slots by TDMA control, the two-way wireless communication is conducted between the indoor master unit 200 operating as a control station and the wireless monitor slave units 300a to 300n operating as slave stations, the transmission from the indoor master unit 200 to the wireless monitor slave units 300a to 300n is conducted in the first half frames (1 to 4 time slots), and the transmission from the wireless monitor slave units 300a to 300n to the indoor master unit 200 is conducted in the second half frames (5 to 8 time slots). In addition, as a control over the frequency hopping, for example, 10 types of frequencies such as f1, f2, . . . , f10 are used and 10 types of hopping patterns such as P1, P2, . . . , P10 are used to communicate. In addition, the time slots used in transmission/reception of image information illustrate a predetermined positional relation between the time slot in which the indoor master unit 200 transmits a control signal and the time slot in which the control signal is transmitted, i.e., an example that the transmission is made in the two time slots among 4 separated time slots and the time slot in which the control signal is transmitted.

The state of the indoor master unit 200 operating as a control station and the wireless monitor slave units 300a to 300n operating as a slave station has three states, i.e., an image communication state in which image information is transmitted from the indoor master unit 200 to the wireless monitor slave units 300a to 300n, a voice communication state in which the indoor master unit 200 and one of the wireless monitor slave units 300a to 300n transmits and receives the voice signal through the two-way wireless communication, and the idle state.

Figure 2:
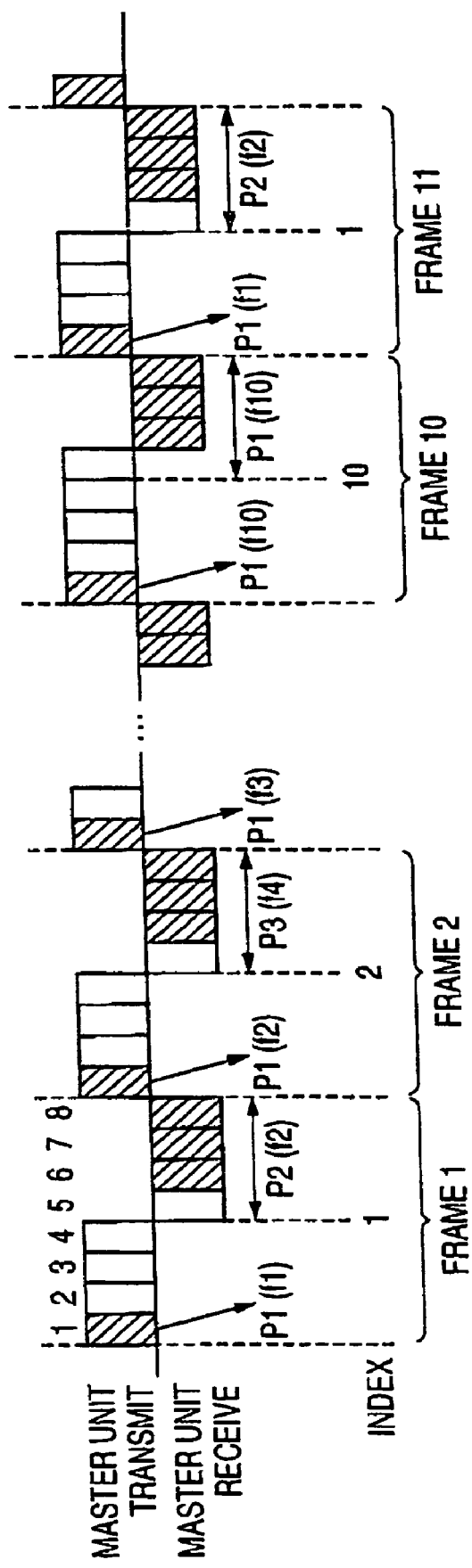
FIG. 2 is a diagram illustrating a frame and slot arrangement, and a frequency hopping timing according to an exemplary door phone system of the present invention.
Figure 3:
FIG. 3 is a diagram illustrating an example of a format of a data string communicating with a door phone system according to an exemplary door phone system of the present invention.
Figure 3:
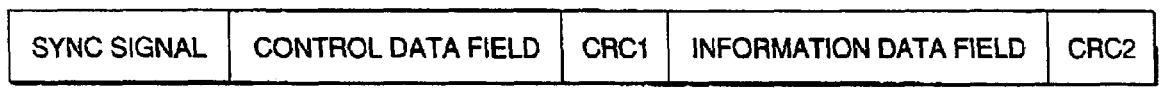

First, an operation of the 'idle state' will be described. In the idle state, the indoor master unit 200 transmits the control signal in the specific time slot within the frames. Although FIG. 2 shows an example of a time slot arrangement of the first embodiment, this example shows a case where the control signal for every frame is transmitted in the time slot 1. In addition, FIG. 3 shows an example of a format of the data string transmitted in each time slot, and FIG. 3(A) shows an example of a format used in the time slot that transmits the control signal. In other words, in this example, the indoor master unit 200 performs transmission of the control signal at the time slot 1 for every frame, using a control data field shown in FIG. 3(A). Here, the transmitted control signal includes identification information of the indoor master unit, a transmission slot number and a hopping pattern for use in the transmission of the control signal, and a hopping pattern received in a reception slot of the corresponding frame. The control unit 214 outputs the control signal to the frame processing unit 209 according to a timing of the transmission slot of the control signal, and the frame processing unit 209 adds the signal for error detection and a sync signal to the control signal and outputs the added control signal to the wireless unit. In addition, the signal for error detection is described in the CRC 1 field of FIG. 3(A), and a code series (e.g., CRC code) for error detection generated by the control signal transmitted from the control data field is used. In addition, the control unit 214 controls the frequency hopping. In other words, a communication frequency corresponding to a hopping pattern stored in the hopping pattern storage unit 212 is read, and the transmission frequency of the wireless unit 210 is established according to a transmission timing of the control signal.

FIG. 5 shows an example of a hopping pattern stored in the hopping pattern storage unit 212. In this example, each hopping pattern from P1 to P10 indicates that frequencies from f1 to f10 are repetitively used. In addition, FIG. 2 shows an example of the transmission frequency used in each frame when transmitting the control signal in the hopping pattern of P1, in which the transmission is performed such that the frame 1 is for f1, the next frame 2 is at f2, and the frame 11 is at f1 again. In addition, an index described in FIGS. 5 and 2 is a variable managed by the control unit 214 for controlling a frequency hopping, and a value from 1 to 10 is used for each frame. For example, for a frame having an index of 1, the communication is made at f1 when the hopping pattern of P1 is used, and the communication is made at f2 when the hopping pattern of P2 is used.

Next, a reception control of the indoor master unit 200 in the idle state will be described. The indoor master unit 200 receives a call from the wireless monitor slave units 300a to 300n while sequentially changing the hopping pattern for each frame in the time slot other than the time slot in which the control signal of the second half of the frame is transmitted. The control unit 214 reads the frequency received from the hopping pattern storage unit 212 according to a timing of the receiving time slot, and establishes a reception frequency of the wireless unit 210. When a call from one of the wireless monitor slave units 300a to 300n is received, and the received data is output to the frame processing unit 209, the control signal in the control data field and the signal for error detection are separated in the frame processing unit 209 based on a sync signal, and a determination is made as to an error of the control signal based on the received signal for error detection. When it is determined to be a normal reception, the received control signal is informed to the control unit 214. In FIG. 2, an example where reception is conducted at the time slots 6 to 8 of each frame is illustrated. Here, the reception at the frequency corresponding to a hopping pattern of P2 is performed in the frame 1, and the hopping pattern is changed by 1 for the next frame and thus the reception is performed at the frequency corresponding to a hopping pattern of P3, and then, the reception is performed with the hopping pattern changed by 1 for each frame.

The reception frequency at this time is determined by an index managed by the control unit 214 and a selected hopping pattern. In other words, as shown in FIG. 2, when the hopping pattern of P2 is used in the frame 1 having an index of 1, the reception is performed at f2, and when the hopping pattern of P3 is used in the frame 2 having an index of 2, the reception is performed at f4.

Next, a control of the wireless monitor slave units 300a to 300n in the idle state will be described.

The wireless monitor slave units 300a to 300n successively receives a frequency one by one, in which the indoor master unit 200 transmits the control signal, in order to receive the control signal of the indoor master unit 200, and performs a supplemental operation of the indoor master unit 200. When the control signal of the indoor master unit 200 is successively received, and then, the reception is performed such that a reception frequency is changed for each sequential frame, and the control signal of the indoor master unit is received. Further, the transmission slot number and hopping pattern information for use in a transmission of the control signal included in the control signal of the indoor master unit 200 are received, and a synchronization of a frame, time slot, and frequency hopping to the indoor master unit 200 is established. In other words, the control unit 311 reads any one frequency stored in the hopping pattern storage unit 309, and controls the wireless unit to receive successively at the frequency. The reception data string received and demodulated at the wireless unit 307 is output to the frame processing unit 306. In the frame processing unit 306, the sync signal included in the reception data string is detected, and when the sync signal is detected, the control signal within the control data field and the signal for error detection are separated based on the sync signal, and a determination as to an error of the control signal is made based on the received signal for error detection. When it is determined to be a normal reception, the received control signal is informed to the control unit 311.

Based on identification information of the indoor master unit included in the control signal, the control unit 311 determines whether there is a waiting indoor master unit, and when there is a waiting indoor master unit, a control is made such that an intermittent receiving operation is executed for each frame. In other words, in the same manner as the indoor master unit 200, the control unit 311 reads the frequency sequentially received from the hopping pattern storage unit 309, based on an index managed by the control unit 311, and controls the wireless unit 307 to perform reception according to a timing of the time slot in which the control signal of the indoor master unit is received while changing a reception frequency for each frame. First, when the control unit 311 makes a successive reception, in case that the frequency read from the hopping pattern storage unit 309 is f1 corresponding to an index 1 of the hopping pattern of P1, the index for each frame is received one by one at f2, f3, . . . , after the control signal of f1 is received through a successive reception. Further, when the transmission slot number and hopping pattern information for use in a transmission of the control signal included in the control signal transmitted from the indoor master unit 200 is received, a synchronization of the indoor master unit with the time slot and the frequency hopping, i.e., a synchronization of the index is established.

Next, an operation of the 'image communication state' will be described. When control unit 214 of the indoor slave unit 200 is informed from the call detection unit 204 that the call switch of the call detection unit 103 of the front door slave unit 100 is pushed, the control unit 214 begins to control the operation from the idle state to the image communication state. The control unit 214 outputs annunciating information to indicate transmission start of image information and call to change the control signal to the frame processing unit 209 according to a timing of the timing slot that transmits the control signal. For the transmission frequency at this time, the control of frequency hopping when the control signal is transmitted continues. Further, image information starts to be transmitted from the next frame in which the annunciating information is transmitted. The transmission of image information is performed in the time slot that transmits the control signal and the time slot corresponding to the time slot that transmits the control signal.

For example, when the control signal is transmitted in the time slot 1 as shown in FIG. 2, image information is transmitted in the time slot 1 and the time slot 5. In addition, for the time slot 1 at this time, a format of the transmission data string is changed so as to transmit the control signal and image information at the same time. An example of a format when transmitting image information will be described in FIG. 3(B). In this example, image information is transmitted in an information data field. In addition, as data for error detection of the information data field for transmitting the image information, a code for new error detection can be affixed. In FIG. 3(B), it is referred to as CRC 2. Further, in the same manner, as a format for the transmission data string used for a communication of a time slot (time slot 5) corresponding to a time slot (time slot 1) in which the control signal is transmitted, the format shown in FIG. 3(B) is used and image information is transmitted in the information data field.

In addition, for a transmission frequency of the time slot 1, a control of the frequency hopping when transmitting the control signal continues, and thus the transmission frequency of the time slot 5 can determine a transmission frequency, with a hopping pattern selected based on the hopping pattern of the time slot 1. For the hopping pattern selected at this time, when the transmission of the time slot 1 uses a hopping pattern of P1, it is desirable that the transmitting frequencies adjacent to the time slot 1 and the time slot 5 are not equal to each other, under the state that the transmission of the time slot 5 uses a hopping pattern of P6. Here, with respect to the hopping pattern used in the time slot corresponding to the time slot that transmits the control signal, an operation will be described using an example where the hopping pattern used in the time slot that transmits the control signal is added to 5, and then divided by 10, and the hopping pattern of the remaining herein is used.

In addition, the control unit 214 divides image information stored in the image information storage unit 203 into a data length that can be transmitted in one time slot and reads it, and affixes the divided image information to a transmission sequence number having the predetermined same number to make retransmission. The transmission sequence number and divided image information are output to the frame processing unit 209 according to a transmission timing, in order to transmit the time slot that transmits the control signal and the information data field of the time slot corresponding to the time slot that transmits the control signal. The frame processing unit 209 adds a code for error detection (CRC 2) based on a data string of the information data field, and generates the data string in the format of FIG. 3(B) to output to the wireless unit 210. In addition, the divided image information is transmitted, while following the control of the control unit and changing the frequency for each time slot 214 by the wireless unit 210.

Further, when the control unit 311 of the wireless monitor slave units 300a to 300n receives annunciating information informing that the call switch 103a of the call detection unit 103 of the front door slave unit 100 is pushed, indicating the transmission start of image information, and transmitted from the indoor master unit 200, the control unit 311 starts the control to execute an operation from the idle state to the image communication state.

In the idle state, the wireless monitor slave units 300a to 300n are in the receiving state synchronous to the indoor master unit 200 to receive a time slot in which the indoor master unit 200 transmits a control signal when the indoor master unit 200 transmits annunciating information in the time slot that transmits the control signal, the data string including the annunciating information is received and demodulated in the wireless unit 307, and output to the frame processing unit 306. The frame processing unit 306 separates the control data field based on the sync signal included in the reception data string, and informs to the control unit 311.

The control unit 311 interprets the data string of the informed control data field, and if it is annunciating information, the control unit 311 receives image information transmitted from the indoor master unit 200 from the next frame, so that in addition to the time slot that receives the control signal which is already receiving, the control unit 311 starts the control of the wireless unit 307 such that the reception of the time slot corresponding to the time slot for receiving the control signal begins. At this time, a control of the reception frequency of the time slot corresponding to the time slot for receiving the control signal is required to match a transmission frequency of the indoor master unit 200, so that a reception frequency is determined in the same manner as the indoor master unit 200 determines the transmission frequency. In other words, based on a hopping pattern for use in the time slot for receiving the control signal, the hopping pattern of the time slot corresponding to the time slot for receiving the control signal is selected, so that the reception frequency of each frame can be determined.

Accordingly, the wireless monitor slave units 300a to 300n that receive annunciating information becomes a state where image information sent from the indoor master unit 200 can be received in the time slot for receiving the control signal and the time slot corresponding to the time slot for receiving the control signal. Further, when the signal including image information sent from the indoor master unit 200 is received and demodulated in the wireless unit 307, and output to the frame processing unit 306, the frame processing unit 306 separates data of an information data field and a code for error detection (CRC 2) of the information data field, based on the sync signal included in the reception data string, and interprets whether or not there is a reception error of the information data field based on the code for error detection (CRC 2). Further, when there is no reception error, data of the information data field is output to the control unit 311. When the control unit 311 receives data of the information data field, i.e., the transmission sequence number and divided image information, the control unit 311 interprets whether or not image information is repetitively received based on the transmission sequence number, and if it is new image information, outputs image information to the monitor circuit 304, and thus the image is displayed on the monitor 305.

In addition, when continuity of the transmission sequence number appended to the received divided image information is lost, the reception data including divided image information to be retransmitted are all deleted by the reception error and thus image information is missing. Here, the control unit 311 outputs error information to the monitor circuit 304, and the monitor circuit 304 complements the missed image information and displays information on the monitor 305. For example, when image information transmitted from the indoor master unit is well known bitmap data, the control unit 311 calculates the number of missed time slots based on the received transmission sequence number, calculates the number of data of missed image information based on the number of missed time slots and a communication format, and informs the number of missed image information along with error information to the monitor circuit 304. Further, the monitor circuit 304 corrects image information of some data of lost image information such as displaying black color, and controls the image displayed on the monitor 305 not to produce distortion due to missing image information.

Figure 4:
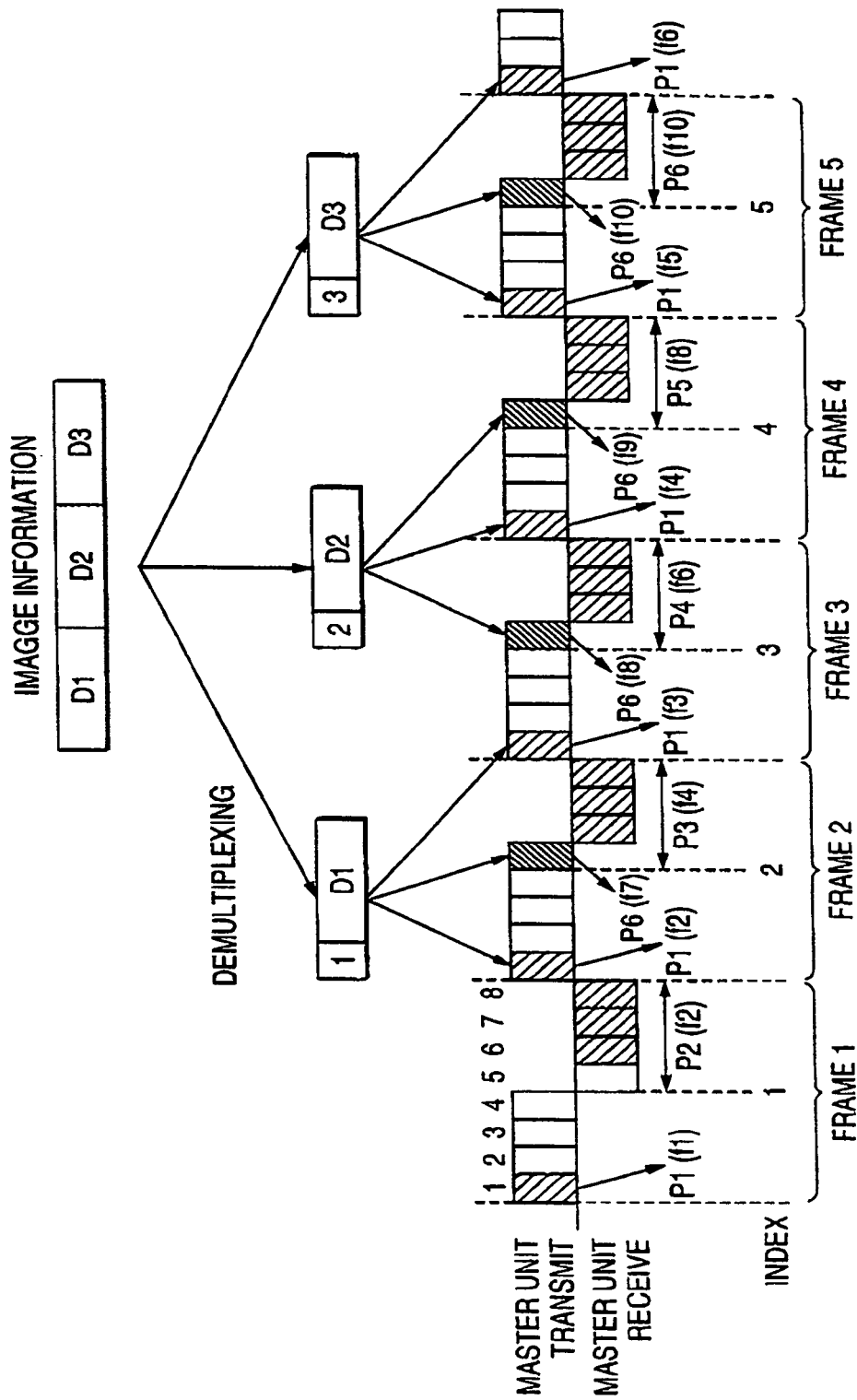
FIG. 4 is a diagram illustrating an operation to divide and transmit image information according to an exemplary door phone system of the present invention.

Next, a manner in which image information is divided to be transmitted will be described with reference to FIG. 4. FIG. 4 shows an example of transmitting image information when the indoor master unit 2000 transmits the control signal in a hopping pattern 1 within the time slot 1. In addition, a control over the frequency hopping when the index at the frame 1 is 1 is illustrated.

When the indoor master unit transits from the idle state in which only the transmission of the control signal is performed to the image communication state, first, the indoor master unit performs the transmission of annunciating information to the time slot that transmits the control signal. In an example of FIG. 4, the annunciating information is transmitted in the time slot 1 of the frame 1. Further, from the frame 2, the transmission of image information starts. In FIG. 4, an example is illustrated in which image information for one screen is divided into three, i.e., D1, D2, and D3, each of them is affixed to the transmission sequence numbers of 1 to 3, and the transmission is performed three times. In other words, the transmission sequence number of 1 is affixed to the first divided image information D1 and transmitted in 3 times slots, i.e., the time slot 1 of the frame 2, the time slot 5 of the frame 2, and the time slot 1 of the frame 3. In the same manner, the transmission sequence number of 2 is affixed to the second divided image information D2, and transmitted in 3 time slots, i.e., the time slot 5 of the frame 3, the time slot 1 of the frame 4, and the time slot 5 of the frame 4. In addition, the transmission sequence number of 3 is affixed to the third divided image information D3, and transmitted to 3 time slots, i.e., the time slot 1 of the frame 5, the time slot 5 of the frame 5, and the time slot 1 of the frame 6. At this time, the hopping pattern of the time slot 5 is selected base on the hopping pattern of the time slot 1, and thus, when the hopping pattern of the time slot 1 is P1, the hopping pattern of the time slot 5 is P6, and the transmission frequency at the time of transmitting the same image information is controlled such that all other frequencies are selected. For example, image information D1 is transmitted at the frequencies of f2, f7 and f3.

Next, an operation of the 'voice communication state' will be described. While the wireless monitor slave units 300a to 300n are in the image communication state, when the answering switch 310 of one of the wireless monitor slave units 300a to 300n is pushed, the wireless monitor slave units 300a to 300n starts to control transition to the voice communication state. For example, when the control unit 311 of the wireless monitor slave unit 300a detects that the answering switch 310 is pushed, the control unit 311 selects the time slot other than the time slot that is receiving image information, and starts the control such that the two-way wireless communication with the indoor master unit 200 begins (For example, when the wireless monitor slave unit 300a selects the time slot 6, the time slot 6 is used to transmit from the wireless monitor slave unit 300a to the indoor master unit 200 and time slot 2 is used in the transmission from the indoor master unit 200 to the wireless monitor slave unit 300a). The control unit 311 of the wireless monitor slave unit 300a calculates a hopping pattern in which the indoor master unit 200 is waiting in the next frame, based on the current index, reads a communication frequency corresponding the calculated hopping pattern from the hopping pattern storage unit 309, establishes a transmission frequency of the wireless unit 307 according to a timing of the selected time slot of the next frame, and outputs a control signal of a wireless link activation request to the frame processing unit 306.

In the frame processing unit 306, a transmission data string that has the control signal of the wireless link activation request in the control data field of the format shown in FIG. 3(B) is generated to be output to the wireless unit 307, and the control signal of the wireless link activation request is transmitted. Next, in order to communicate with the indoor master unit 200, the control unit 311 controls the time slot that transmits the control signal of the wireless link activation request and the receiving time slot corresponding to the time slot that transmits the control signal of the wireless link activation request, such that transmission and reception are performed based on the predetermined hopping pattern, in both time slots.

Further, the indoor master unit 200 always performs the reception of the receiving time slot other than the receiving time slot corresponding to the time slot that transmits the unused control signal, so that when the data string including the control signal of the wireless link activation request is transmitted from the wireless monitor slave unit 300a, the data string is received and demodulated by the wireless unit 210, and output to the frame processing unit 209. The frame processing unit 209 separates the control data field based on the sync signal included in the reception data string to inform to the control unit 214. The control unit 214 interprets the data string of the informed control data field, and if it is a control signal of the wireless link activation request, the control unit 214 start the control of the wireless unit 210 such that transmission and reception begins between the time slot for receiving the request signal of the wireless link activation request and the corresponding time slot, in order to perform the two-way communication with the wireless monitor slave unit 300, after sending a display stop signal to the remaining wireless monitor slave units 300b to 300n.

In addition, according to the time slot for the two-way wireless communication with the wireless monitor slave unit 300a to a timing of the time slot for transmission, the control unit 214 outputs the control signal responding to the wireless link activation request to the frame processing unit 209. The frame processing unit 209 generates a transmission data string having the control signal responding to the wireless link activation request in the control data field of the format shown in FIG. 3(B), outputs the transmission data string to the wireless unit 210, and transmits the control signal responding to the wireless link activation request. In addition, the control unit 214 performs connection of the two-way communication with the wireless monitor slave unit 300a, controls the voice circuit 206, converts the voice signal from the front door slave unit 100 into a digital signal and outputs the digital signal to the frame processing unit 209, and converts the voice signal output from the frame processing unit 209 into an analog signal and outputs the analog signal to the front door slave unit 100 through the multiplexing/demultiplexing circuit 220. Further, when the wireless monitor slave unit 300a receives the control signal responding to the wireless link activation request from the indoor master unit 200, in the same manner, the wireless monitor slave unit 300a establishes a voice path, controls the voice circuit 302, converts the voice signal from the telephone call unit 303 into a digital signal and outputs the digital signal to the frame processing unit 306, and converts the voice signal output from the frame processing unit 306 into an analog signal and outputs the analog signal to the telephone call unit 303.

In addition, the digitally converted voice signal transmitted and received at this time is transmitted and received in the information data field shown in FIG. 3(B). Further, when the control unit 214 is transferred to the voice communication state and the two-way wireless communication is established, the control unit 214 of the indoor master unit 200 informs to the frame processing unit 209 the time slot in which the two-way communication is performed, and the frame processing unit 209 processes the data string of the information data field of the informed time slot as voice information, and similarly, the control unit 311 of the wireless monitor slave unit 300a informs to the frame processing unit 306 the time slot in which the two-way communication is performed, and the frame processing unit 306 operates as processing the data string of the information data field of the informed time slot as voice information.

In addition, in the same order of establishing the voice path of the wireless monitor slave unit 300a, the wireless monitor slave unit 300a makes a wireless link activation request in two time slots, establishes a wireless line of one-to-one communication with the indoor master unit in two time slots, and uses one for the voice path and the other for camera image update of the front door slave unit. In this case, the wireless monitor slave unit 300a sends to the indoor master unit a retransmission request of the image information having an error detected in the CRC 1 and 2, as shown in FIG. 3(B). Further, the indoor master unit retransmits image information indicated from the image information storage unit 203 to the wireless monitor slave unit 300a, so that it is possible to display a high-speed updated image on the wireless monitor slave unit 300a with high reliability.

Next, a transition from the voice communication state or the image communication state to the idle state is conducted.

During the voice communication state, a call stop manipulation is conducted with the answering switch 310 of the wireless monitor slave unit 300a, and when detected in the control unit 311, the stop processing of the voice communication begins. According to a timing of the slot that transmits the voice communication, the control unit 311 outputs the stop control signal to the frame processing unit 306, and the stop control signal is transmitted to the indoor master unit 200 in the same manner as transmitting the control signal of the wireless link establishment request. Further, when the stop check control signal is received from the indoor master unit 200, the transmission and reception of the slot for performing the voice communication and the reception of the slot in a predetermined positional relationship with the control slot out of the slots for performing the reception of image information are stopped, and the reception of only the control slot is executed and the transition to the idle state is conducted.

Further, when the indoor master unit 200 receives the stop control signal from the wireless monitor slave unit 300a, the indoor master unit 200 transmits the stop check control signal in the slot that transmits the voice signal, in the same manner as transmitting the signal responding to the wireless link establishment request. Further, the transmission and reception of the slot for performing the voice communication and the transmission of the slot in a predetermined positional relationship with the control slot out of the slots for performing the transmission of image information are stopped, and in addition, the image transmission at the control slot is stopped and the transition to the idle state is conducted. An operation will be conducted in the same manner, even when other wireless monitor slave units 300b to 300n answer.

In addition, when the indoor master unit 200 does not receive a wireless link establishment request from the wireless monitor slave units 300a to 300n in a predetermined time under the image communication state, the transmission of the slot in a predetermined positional relationship with the control slot is stopped, and in addition, the image transmission at the control slot is stopped and the transition to the idle state is conducted.

As described above, according to an embodiment of the present invention, when image information is transmitted from the indoor master unit 200 to the wireless monitor slave units 300a to 300n, image information is divided into a data size that can be transmitted in one TDMA time slot, the transmission sequence number is appended to the divided image information, and is transmitted a plurality of times. Further, the divided image information sent several times are received, respectively, at the side of the wireless monitor slave units 300a to 300n, a display is conducted excluding the repetitively received image information is excluded based on the transmission sequence number, so that even when the wireless monitor slave units 300a to 300n are arranged in a location having a low reception level of the transmission signal from the indoor master unit 200, where a distance between the indoor master unit 200 and the wireless monitor slave units 300a to 300n are far from each other, it is possible to suppress a lack of information due to a reception error, by receiving the same information several times, and it is also possible to enhance reliability of transmission of image information through one-way wireless communication.

In addition, even in a circumstance interrupted by an interference wave, by changing the communication frequency of the time slot in transmitting the same information several times, respectively, it is possible to reduce a risk of being interrupted by the interference wave at all frequencies, so that it is also possible to suppress a lack of information due to the reception error and to enhance reliability of the transmission of image information through one-way wireless communication.

In addition, the image transmission from the indoor master unit 200 to the wireless monitor slave units 300a to 300n has no limitation to the number of the wireless monitor slave units for receiving image information transmitted by the indoor master unit 200, in order to perform one-way wireless communication, so that there is a benefit in that any number of wireless monitor slave units can be arranged.

In addition, when image information received from the wireless monitor slave units 300a to 300n is lacking, a lacking information length is calculated based on the transmission sequence number and the like, and the image displayed on the monitor 305 of the wireless monitor slave units 300a to 300n is corrected. Therefore, even when image information is lacking, it is advantageous possible to reduce a distortion of the displayed image.

In addition, when an extension communication is performed between the plurality of wireless monitor slave units through the indoor master unit, the number of the time slots that can be used in the two-way communication between the indoor master unit and the wireless monitor slave unit is reduced. However, by transmitting image information and annunciating information in the time slot that transmits the control signal and the time slot corresponding to the time slot that transmits the control signal, the communication of image information is enabled and convenience can be improved, irrespective of the number of time slots for use in the two-way wireless communication between the indoor master unit 200 and the plurality of wireless monitor slave units.

Next, another control method between the indoor master unit and the wireless monitor slave units of the first embodiment will be described.

Although the first embodiment is illustrated in the context that a predetermined time slot and a hopping pattern is used when image information is transmitted from the indoor master unit 200 to the wireless monitor slave units 300a to 300n, it is possible to make a transmission and reception while informing the used time slot and hopping pattern to the wireless monitor slave units 300a to 300n. For example, by annunciating information that indicates a transmission start of image information from the indoor master unit, the time slot that transmits image information and the used frequency (hopping pattern in case of the frequency hopping) are informed, and based on annunciating information, the control is made as activating the time slot for receiving the image information of the wireless monitor slave units.

With this control, the number of time slots and a location of the time slot for use in the transmission from the indoor master unit to the wireless monitor slave units 300a to 300n can be freely set. Further, with the transmission and reception from each other, it is possible to transfer image information in the time slot that transmits the control signal, the time slot corresponding to the time slot that transmits the control signal, and all time slots for use in the two-way communication, and thus it is possible to make an image information transmission rate higher.

In addition, by deleting the control data field and the error detection code in the format of the time slot that transmits image information, and changing the format to allow more image information to be sent in one time slot, it is possible to make an image information transmission rate higher. In addition, even when image information is transmitted in the time slot that transmits the control signal, the format at the time of transmitting the image signal can be converted after the transmission of annunciating information, and at the receiving side, the reception formation can be changed when the annunciating information is received, so that the same effect can be given.

In addition, by transmitting annunciating information that indicates a transmission start of image information again, it is possible to reduce a risk of control switch failure due to a reception error of the annunciating information. In addition, at this time, by transmitting the annunciating information in the control data field while transmitting image information in the information data field, it is possible to prevent the image information transmission rate from being degraded due to a retransmission of annunciating information.

In addition, in the time slot where the indoor master unit other than the wireless monitor slave unit is ready and waiting, it is possible to transmit the control signal that request to change the number of retransmission, and to change the number to send the same image information based on the request. Accordingly, when the communication state is degraded and image information is lacking during the reception of image information, a communication quality is improved with the control such as increasing the number to send the same image information. In addition, when the reception state is good, it is possible to make a control such as increasing the transmission rate of image information, with the control to reduce the number of sending the same image information, and it is possible to make an optical retransmission control. When the number different from the number of sending the same image information from the plurality of wireless monitor slave units is still required, the indoor master unit selects the maximum number.

With the arrangement of the present embodiment, it is possible to display an image of the front door slave unit with high reliability on the plurality of wireless monitor slave units before any of the wireless monitor slave units responds, and to easily determine of whom the plurality of users will respond. In addition, by printing images taken by the front door slave unit along with call information in the wireless transmission several times, a highly reliable image is displayed on the plurality of wireless monitor slave units. More specifically, a multiplexing communication is performed in the TDMA scheme, and image information is transferred through the one-way wireless communication in which the image information is transmitted and received several times.

In addition, the door phone system of the present embodiment performs multiplexing communication in the TDMA scheme, and transmits information in the one-way wireless communication that transmits and receives image information several times, so that it is possible to transfer information with high reliability and a small information loss due to a reception error in each one wireless unit at the transmission and reception sides without limiting the number of reception sides. In addition, with the frequency hopping scheme, when the transmission and reception are performed in the plurality of time slots, a different hopping sequence is used so that the transmission frequency is changed when transmitting the same image information several times. Therefore, it is possible to reduce establishment of a reception error in the interference of all of the same image information transmitted several times due to the interruption wave, and it is advantageously possible to transfer information with higher reliability.

In addition, in the time slot that transmits the control signal, or the time slot in a predetermined positional relationship with the time slot that transmits the control signal, annunciating information or image information is transmitted and received, so that it is possible to effectively use an available time slot. In addition, by changing the number of transmitting the image information based on the communication state, when the communication state is degraded and the image information is lacking during the transmission of image information, it is possible to enhance the communication quality with the control such as increasing the number of transmitting the same image information. In addition, when the reception state is good, it is possible to make a control such as increasing the image information transmission rate, with the control such as reducing the number of transmitting the same image information. Thus, it is possible to make an optimal retransmission control based on the communication state.

In addition, according to an embodiment of the present invention, with one wireless unit, an object that a highly reliable information transmission is realized at the same time for a plurality of wireless monitor slave units is realized with a multiplexing communication in the TDMA scheme and the information transmission in one-way wireless communication, in which the image information is transmitted and received several times.

In addition, according to an embodiment of the present invention, an object that a lack of information due to a reception error by a wireless interference in transmitting information in one-way wireless communication is reduced is realized with a frequency hopping scheme, and with a different hopping sequence when transmission and reception are performed in a plurality of time slots. In addition, according to an embodiment of the present invention, with respect to an effective use of the time slot in performing the TDMA communication, it is realized with the transmission and reception of annunciating information and image information in the time slot that transmits the control signal and the time slot in a predetermined positional relationship with the time slot that transmits the control signal. In addition, according to an embodiment of the present invention, an effective use of the time slot in performing the TDMA communication is realized by a control such as changing the number of transmission based on the reception state.

Figure 7:
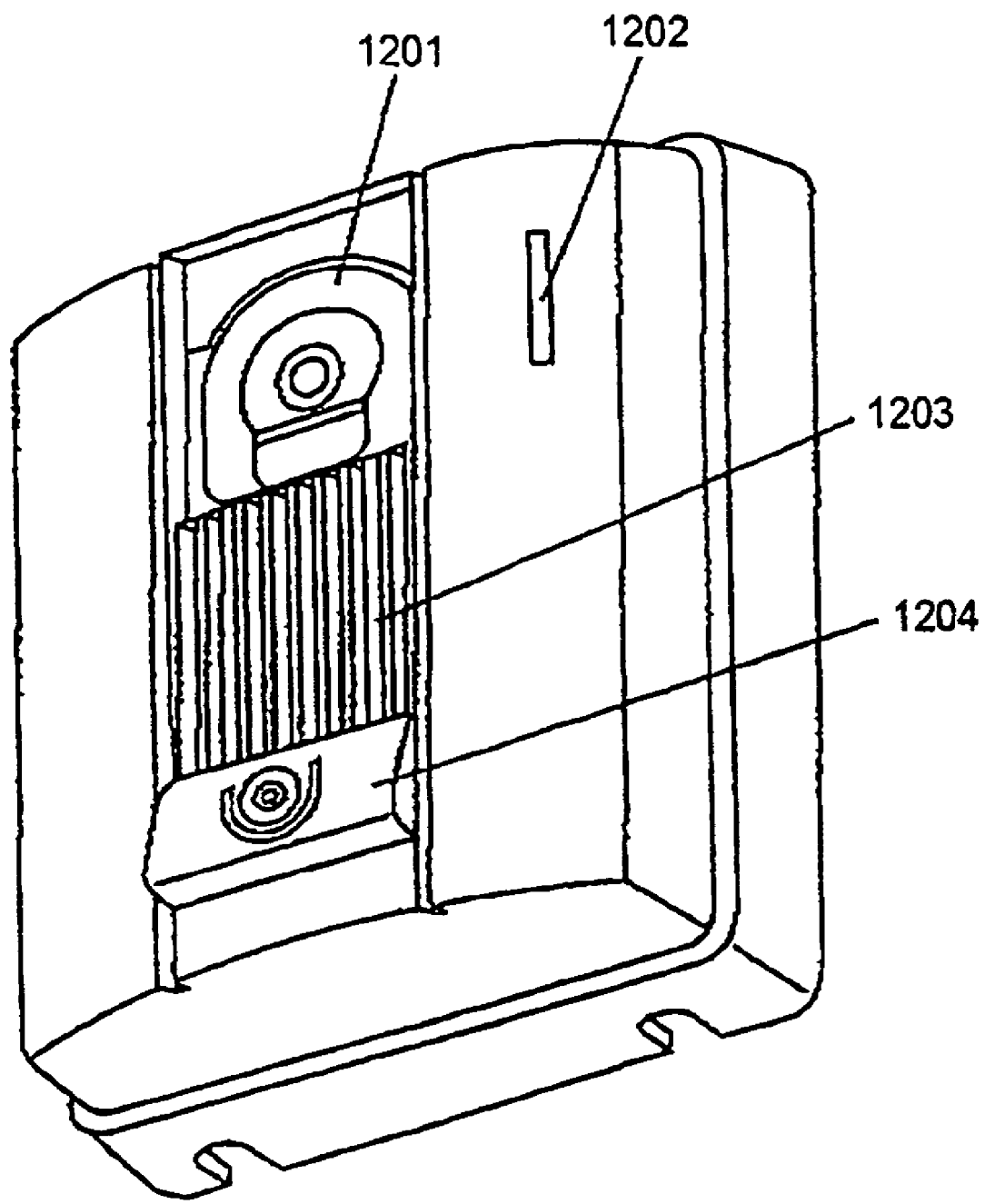
FIG. 7 is an exterior view of a front door slave unit of a communication apparatus according to an embodiment of the present invention.

An exterior view of the front door slave unit 100 is shown in FIG. 7.

A front face of the front door slave unit has a camera 1201 for taking a visitor as an image signal, a microphone 1202 and a speaker 1203 for communicating with the visitor, and a calling button 1204 for informing the visit to the indoor master unit 200 and a wireless monitor slave unit 300.

The camera 1201 corresponds to the camera unit 101 of FIG. 1, the microphone 1202 and the speaker 1203 corresponds to the telephone call unit 102 of FIG. 1, and the call button 1204 corresponds to a call switch 103*a* of FIG. 1.

Figure 8:
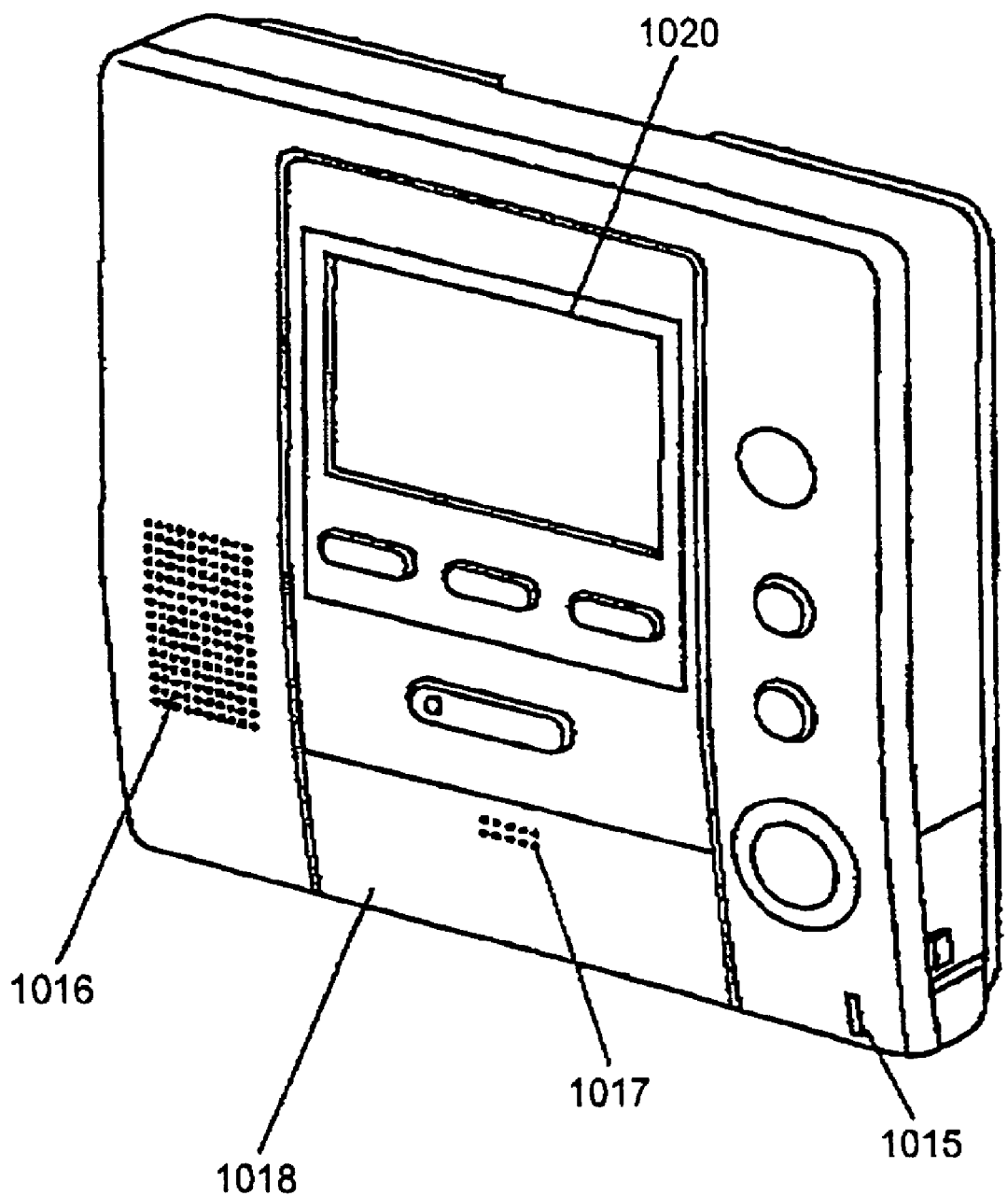
FIG. 8 is an exterior view of an indoor handset of a communication apparatus according to an embodiment of the present invention.

An exterior view of the inner master unit 200 is shown in FIG. 8.

On a front face of the inner master unit 200, an LCD panel 1020 for forming a visitor image of the front door slave unit 100, a key matrix switch 1018, and an LED 1017 for displaying the visit using light are provided. In addition, the inner master unit 200 has a microphone 1015 and a speaker 1016 for communicating with the visitor.

The microphone 1015 and the speaker 1016 correspond to the telephone call unit 207 of FIG. 1, the LED 1017 corresponds to the annunciating unit 205 of FIG. 1, a key matrix switch 1018 corresponds to the answering switch 208 of FIG. 1, and an LCD panel 1020 corresponds to the monitor 202 of FIG. 1.

Figure 9:
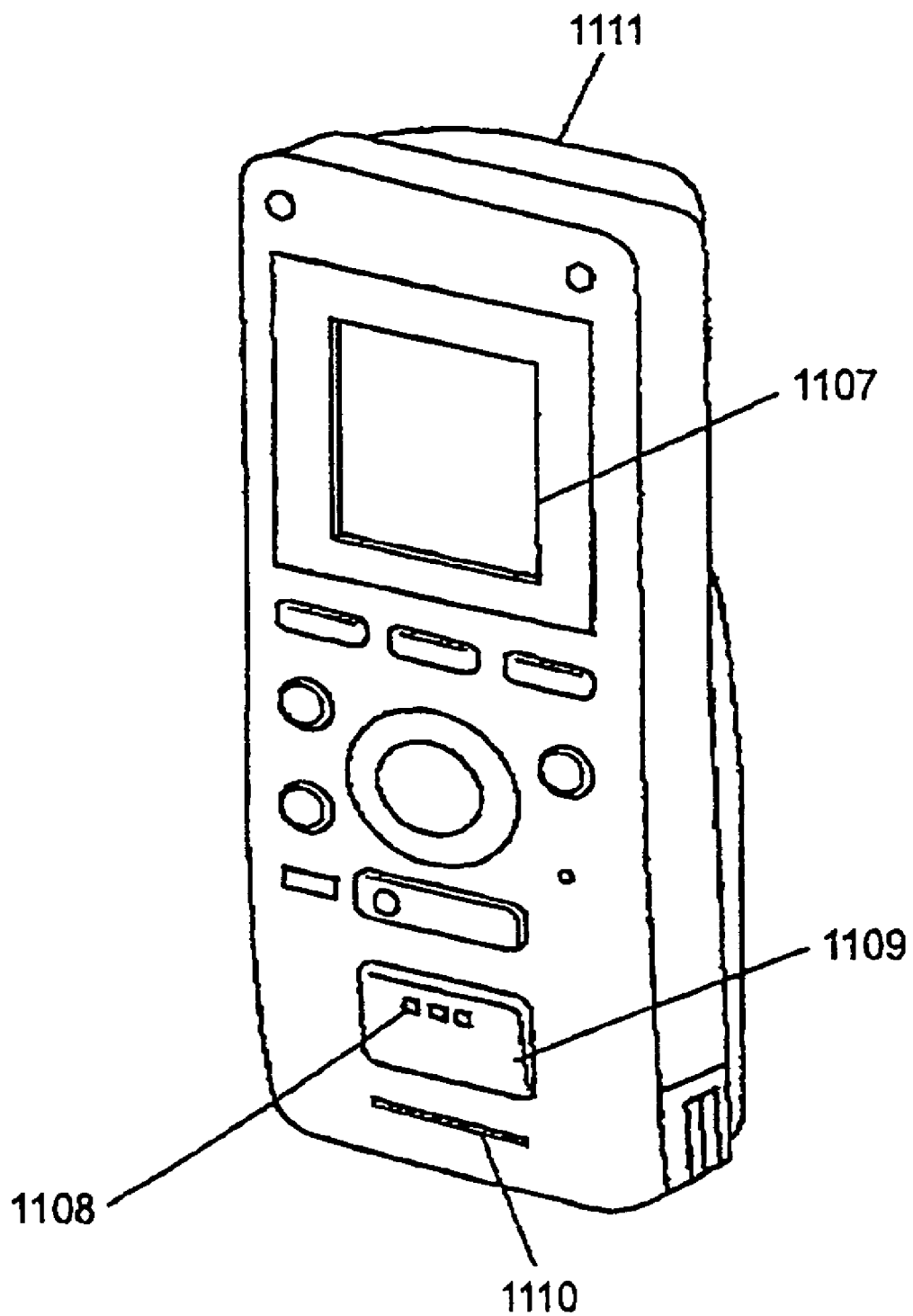
FIG. 9 is an exterior view of a wireless monitor slave unit of a communication apparatus according to an embodiment of the present invention.

An exterior view of a codeless telephone is shown in FIG. 9.

The wireless monitor slave unit 300 is portable. A front face of the wireless monitor slave unit 300 has an LCD panel 1107 for illuminating a visitor image of the front door slave unit 100, a key matrix switch 1109, and an LED 1108 for displaying the visitor using light. In addition, the wireless monitor slave unit 300 has a microphone 1110 for communicating with the visitor and a speaker 1111 on the backside of the wireless monitor slave unit 300.

The LCD panel 1107 corresponds to the monitor 305 of FIG. 1, the LED 1108 corresponds to the annunciating unit 301 of FIG. 1, the key matrix switch 1109 corresponds to the answering switch 310 of FIG. 1, and the microphone 1110 and the speaker 1111 correspond to the telephone unit 303 of FIG. 1.

With this arrangement, the visitor can use the front door slave unit 100 and communicate with an indoor user. Here, an image of the front door slave unit 100 can be passed through the indoor master unit 200 having a door phone interface 1001, and output to the indoor user on the wireless monitor slave unit 300. In addition, a conversation is made between the front door slave unit 100 and the wireless monitor slave unit 300. For this reason, the indoor user can carry the wireless monitor slave unit 300 or put it on a convenience place in ready.

This application is based upon and claims the benefit of priority of Japanese Patent Application No. 2004-299891 filed on Oct. 14, 2004, the contents of which are incorporated herein by reference in its entirety.

What is claimed is:

1. A communication apparatus for use in a door phone system for communicating with an outdoor slave unit having a camera and wirelessly communicating with a plurality of indoor slave units having a display, the communication apparatus comprising:
    a first communication unit for communicating with the outdoor slave unit, the first communication unit receiving an image taken by the camera of the outdoor slave unit;
    a second communication unit for communicating with the plurality of indoor slave units, the second communication unit transmitting the image to the plurality of indoor slave units respectively; and
    a detection unit for detecting an activation of one of the plurality of indoor slave units which receives the image from the second communication unit and displays the received image, wherein:
    the second communication unit transmits another image taken by the outdoor slave unit only to the activated indoor slave unit detected by the detection unit.

2. The communication apparatus according to claim 1, further comprising:
    a call sensing unit for sensing a call from a calling unit of the outdoor slave unit; and
    an annunciating unit for outputting an alarm sound based on the sensing of the call sensing unit, wherein:
    the second communication unit transmits a control signal to the plurality of indoor slave units based on the sensing of the call sensing unit, and thus, the plurality of indoor slave units are informed that there was a call from the outdoor slave unit.

3. The communication apparatus according to claim 1, wherein the first communication unit comprises a microphone unit, a speaker unit, and a display unit.

4. The communication apparatus according to claim 3, wherein the display unit displays an image taken by the camera of the outdoor slave unit.

5. The communication apparatus according to claim 1, wherein the second communication unit uses TDMA scheme in which one period of a predetermined time interval is divided into N predetermined times and a communication is made using each of N divided times.

6. The communication apparatus according to claim 1, wherein in response to the detection unit detecting that a communication unit of one of the plurality of indoor slave units receiving the image is activated, a voice and image communication path of the indoor slave unit whose communication unit is detected as being activated and the communication apparatus is opened to start a communication.

7. A communication method using a communication apparatus for use in a door phone system capable of communicating with an outdoor slave unit having a camera and wirelessly communicating with a plurality of indoor slave units having a display, the communication method comprising:
    (a) communicating with the outdoor slave unit, the communicating including receiving an image taken by the camera of the outdoor slave unit;
    (b) communicating with the plurality of indoor slave units including transmitting the image to the plurality of indoor slave units respectively; and
    (c) detecting an activation of one of the indoor slave units which receives the image in operation (b); and
    (d) transmitting another image taken by the outdoor slave unit only to the one indoor slave unit whose activation is detected in operation (c).

8. The communication method according to claim 7, further comprising:
    sensing a call from a calling unit of the outdoor slave unit; and
    outputting an alarm sound based on the call sensing,
    wherein a control signal is transmitted to the plurality of indoor slave units based on the call sensing, and thus, the plurality of indoor slave units are informed of a call from the outdoor slave unit.

9. The communication method according to claim 7, wherein a TDMA scheme is used in which one period of a predetermined time interval is divided into N predetermined times and a communication is made using each of N divided times.

10. The communication method according to claim 7, wherein in response to a detection that a communication unit of one of the plurality of indoor slave units receiving the image is activated, a voice and image communication path of the one indoor slave unit whose communication unit is detected as being activated and the communication apparatus is opened to start a communication.

11. A door phone system comprising an outdoor slave unit, a master unit separated from the outdoor slave unit and for communicating with the outdoor slave unit, and a plurality of indoor slave units for wirelessly communicating with the master unit, wherein:
    the outdoor slave unit includes a camera unit, a microphone unit, and a speaker unit;
    the master unit includes a microphone unit, a speaker unit, a display unit, and an answering unit that answers a call from a calling unit of the outdoor slave unit;
    each of the plurality of slave units includes a display unit, a microphone unit, and a speaker unit;

by activating the calling unit of the outdoor slave unit, the camera of the outdoor slave unit operates and transmits an image to the master unit;

the master unit transmits the image received from the outdoor slave unit to a plurality of second cordless slave units at the same time;

the plurality of cordless slave units display a received image on the display unit of the respective cordless slave unit; and the master unit that detects that the communication unit of one of the plurality of the cordless slave units receiving the image is activated transmits another image taken by the first cordless slave unit only to the one cordless slave unit.

12. The door phone system according to claim 11, wherein the master unit that detects that the communication unit of one of the plurality of cordless slave units receiving the image is activated opens a voice and image communication path of only one cordless slave unit and the master unit.

13. The door phone system according to claim 11, wherein the indoor master unit includes:

a wireless unit for performing a communication in a TDMA scheme such that one frame of a predetermined time interval is divided into N predetermined slots and a communication is made within each slot;

a storage unit having an interface to input image information for storing input image information; and a control unit for dividing image information stored in the storage unit into data transmitted in one time slot, appending a sequence number into divided data, and repetitively transmitting L times the divided image information and the sequence number in M time slots, where M is larger than or equal to 1 and less than or equal to N.

14. The door phone system according to claim 13, wherein each of the plurality of indoor slave units includes:

a wireless unit for performing a communication in the TDMA scheme such that one frame of a predetermined time interval is divided into N predetermined slots and a communication is made within each slot;

a display unit for display received image information; and a control unit for receiving image information in M time slots where M is larger than or equal to 1 and less than or equal to N, and excluding repetitively received image information to display received image information on the display unit.

15. The door phone system according to claim 14, wherein the indoor master unit transmits annunciating information that indicates information on the slot used in transmitting image information; and the plurality of indoor slave units receive annunciating information to determine which time slot image information is received into.

16. The door phone system according to claim 14, wherein the indoor master unit transmits a control signal in synchronization to a time slot; and the plurality of indoor slave units receive the control signal to communicate in synchronization with the indoor master unit.

17. The door phone system according to claim 14, wherein the plurality of indoor slave units instructs the number of receiving image information to the indoor master unit; and the indoor master unit changes the number of receiving image information based on the instruction.

* * * * *